United States Patent Office 3,692,699
Patented Sept. 19, 1972

3,692,699
$V_2O_5/TiO_2/K_2SO_4$ CATALYST SUITABLE FOR PREPARATION OF PHTHALIC ANHYDRIDE
Shiro Hojo, Niigata-shi, and Kuniko Komiya, Kurashiki-shi, Japan, assignors to Japan Gas-Chemical Company, Inc., Tokyo, Japan
No Drawing. Filed Mar. 8, 1968, Ser. No. 711,515
Claims priority, application Japan, Mar. 13, 1967,
42/15,757
Int. Cl. B01j 11/82
U.S. Cl. 252—440
6 Claims

ABSTRACT OF THE DISCLOSURE

A catalyst for the preparation of phthalic anhydride which comprises vanadium pentoxide, titanium oxide and potassium sulfate and a process for preparing phthalic anhydride by the use of said catalyst. The molar ratio of $V_2O_5/TiO_2/K_2SO_4$ is 1/0.1–5/0.01–0.2.

BACKGROUND OF THE INVENTION (1) Field of the invention

The present invention relates to a catalyst for the preparation of phthalic anhydride by the vapor phase catalytic oxidation of ortho-xylene or naphthalene, and a process for preparing phthalic anhydride by the use of said novel catalyst.

(2) Description of the prior art

Phthalic anhydride can be prepared by the vapor phase catalytic oxidation of naphthalene or ortho-xylene; a catalyst which comprises vanadium pentoxide containing potassium sulfate and a catalyst which comprises mainly vanadium pentoxide are catalysts known for this purpose. The catalyst which comprises principally vanadium pentoxide, potassium sulfate, a so-called German type catalyst, is prepared by mixing vanadium pentoxide, potassium sulfate and silica gel, followed by shaping, drying and calcination of the mixture. A characteristic of the catalyst thus obtained is that it has the advantages of effecting the reaction at a low temperature and of realizing an excellent yield of phthalic anhydride and an excellent selectivity even with a relatively high concentration of the feed gas; on the other hand such advantages can be realized only at a low space velocity, and the yield of phthalic anhydride obtained from a unit amount of catalyst is low, and accordingly it has the great disadvantage of requiring a relatively high equipment cost for use in a commercial operation.

The American type catalyst, in contrast with the German type catalyst, comprises principally vanadium pentoxide to which are added salts or oxides of molybdenum, titanium, nickel, zinc, copper, bismuth, chromium, phosphorous and the like, and is prepared by adding and supporting the above-described mixture on a carrier comprised of pumice, silica gel, diatomaceous earth, alundum, and the like, followed by drying and calcination. A characteristic of this catalyst is that it can be operated at a high space velocity, but this catalyst has disadvantages in that it gives a low yield of phthalic anhydride, has low selectivity, and also its catalyst life is short.

In the preparation of phthalic anhydride by the use of the above catalysts well-known in the art, when naphthalene is used as a feed material, a larger amount of air (oxygen) is required than when ortho-xylene is used, and naphthoquinone, maleic acid, benzoic acid, and the like are formed as by-products, and the ease of the subsequent purification process is dependent on the amount of this naphthoquinone by-product. On the other hand, when ortho-xylene is used as a feed material, the amount of air required is less than when naphthalene is used, and benzoquinone, aldehyde, phthalide, benzoic acid, maleic acid and the like are formed as by-proucts. Of these, phthalide is formed to the extent of 1–3%, and when attempts are made to lower its formation, it leads to another disadvantage in that the yield of phthalic anhydride is lowered or a small amount of benzoic acid by-product results, thus giving rise to difficulty in the purification of the crude phthalic anhydride, and as a result, the formation of phthalide is regarded as one of the causes which reduces the efficiency of the process. Moreover, it has been well-known to those skilled in the art that there is a certain difference in the mechanism between the catalytic oxidation of naphthalene and that of ortho-xylene, and a number of inconveniences are encountered in using without modification a catalyst for the oxidation of naphthalene as a catalyst for the oxidation of ortho-xylene, and it is necessary to use a specific catalyst for each in order to obtain a desired result.

A number of proposals have been made for eliminating these disadvantages. Thus, when the oxidation reaction is carried out by use of the well-known catalyst such as those described above, with naphthalene or ortho-xylene as a feed material, a relatively high yield of crude phthalic anhydride is obtained, but the space-time yield (hereafter designated as S. T. Y.), i.e., the net volume of phthalic anhydride produced per unit volume of catalyst and unit time is low, and as a result, it raises both the equipment cost and the manufacturing cost when used as a commercial process. On the other hand, when operated at a high space velocity (hereafter designated as S. V.), i.e., the gaseous volume (at the normal state) passes through per unit volume of catalyst per one hour and at a high feed material concentration (g. feed/m.³ air) in order to achieve a high S. T. Y., α-naphthoquinone or phthalide is formed as a by-product, and this complicates the process for purification of the crude phthalic anhydride. In order to suppress the formation of these by-products, a high temperature is required at a high S. V. and at a high concentration; in this case the amount of benzoic and maleic acid by-products is increased and these, also, cause trouble in the purification process.

BRIEF SUMMARY OF THE INVENTION

An object of the present invention is to provide a catalyst which will give a lower yield of such undesirable by-products as phthalide and naphthoquinone in the preparation of phthalic anhydride.

Another object of the present invention is to provide a catalyst with which phthalic anhydride can be produced at a high S. V. and with a high concentration of feed material, and, further, which has flexibility on operating conditions.

The present invention comprises using a mixture of vanadium pentoxide ($V_2O_5$), titanium oxide ($TiO_2$), and potassium sulfate ($K_2SO_4$) as the catalyst for the preparation of phthalic anhydride by the vapor phase oxidation of ortho-xylene or naphthalene.

DETAILED DESCRIPTION OF THE INVENTION

When preparing the catalyst according to the present invention, the amount of vanadium compound, titanium compound and potassium sulfate after calcination may take any value so far as the molar ratio of vanadium pentoxide:titanium oxide:potassium sulfate is in the range of 1:0.1–5:0.01–0.2. When the amount of potassium sulfate is small, the reaction temperature characteristics are improved by increasing the amount of titanium oxide, almost without substantial effect on the yield of phthalic anhydride. When the amount of potassium sulfate is large, even with an increased amount of titanium oxide present, the optimum reaction temperature is not lowered sufficiently, and no improvement of the reaction temperature characteristics is obtained and an increased amount of by-products such as phthalide and naphthoquinone is formed and the yield of phthalic anhydride is somewhat lowered. Also, when the molar ratio of titanium oxide to vanadium pentoxide falls below 0.1 mole, a disadvantage arises as a result of lowering of the catalyst activity. No special effect is found when the ratio of titanium oxide to vanadium pentoxide is increased above 5 mole. A molar ratio of less than 0.01 mole of potassium sulfate to vanadium pentoxide causes lowering of the yield as a result of excessive oxidation. Contrary to the above, a molar ratio of more than 0.2 mole suppresses oxidation and results in the formation of by-products such as quinone and phthalide, and both the quality and the yield are lowered. The most suitable composition range of vanadium pentoxide:titanium oxide:potassium sulfate is 1:0.3–1:0.02–0.12. The catalyst of the present invention is obtained by supporting the above three components within the range specified on a carrier such as pumice, alundum, carborundum, silica, aluminum sponge and other carrier bodies well-known to those skilled in the art.

Vanadium pentoxide, ammonium metavanadate, vanadyl sulfate and the like are used as the source of vanadium of the present invention. As the source of titanium, titanium tetrachloride, titanium sulfate, titanium hydroxide and titanium oxaltate and the like are used, and the use of titanium tetrachloride is especially advantageous.

In order to prepare the catalyst of the present invention, a vanadium compound raw material is dissolved in an aqueous solution of oxalic acid, then a titanium compound and potassium sulfate are added to the solution to make a homogeneous solution of a slurry, wherein the components are so compounded that the molar ratio of the three components in the catalyst, i.e., vanadium pentoxide:titanium oxide:potassium sulfate will be in the range of 1:0.1–5:0.01–0.2. The catalyst is readily obtained by supporting the mixture on a carrier and by calcination in order to oxidize the vanadium and titanium compounds.

The amount of vanadium pentoxide, titanium oxide and potassium sulfate supported on a catalyst may have any value in the range of 2–20% by weight as vanadium pentoxide within the molar ratio specified above based on the weight of a carrier. An amount of 3–15% by weight is most desirable.

The process by the use of the catalyst of the present invention prepared as described above is characterized in that the catalyst can be used for the oxidation of both orthoxylene and naphthalene irrespective of their oxidation mechanism, with an excellent selectivity, and that it forms a smaller amount of such by-products as naphthoquinone and phthalide which are detrimental to the purification process and allows the process to be operated at an increased S. V. value of as high as 5,000–8,000 with a high concentration of the feed material in the range of 20–70 g. of feed material per cubic meter of air, thus allowing the preparation of phthalic anhydride in a high S. T. Y. Another advantage is that the catalyst is highly flexible in operating conditions because the yield of the oxidation scarcely varies over a wide range of the space-time yield, and because the initiation temperature of the reaction with this catalyst is around 380° C. and it can be used at a wide range of an optimum reaction temperature of 440–480° C.

As described above, the catalyst of the present invention, by the use of a mixture of vanadium pentoxide, titanium oxide and potassium sulfate, contributes greatly to the commercial preparation of phthalic anhydride with high efficiency from ortho-xylene or naphthalene and satisfies many of the conditions described in the present art.

REFERENCE EXAMPLE 1

Ortho-xylene was oxidized under the conditions described below, by the use of a catalyst prepared by supporting an aqueous oxalic acid solution of vanadium pentoxide-potassium sulfate on 3 mm. particulate pumice, followed by drying and calcination.

The gaseous reaction products were discharged through a crystal depositor column and a gas washer which were placed at the end of a reaction column. The amount of phthalide by-product in the crude phthalic anhydride which deposited out was measured gas chromatographically, and the amount of maleic acid by-product adhering to the crystals and remaining in the washing liquid was measured polarographically. The yield and all the other percents are weight percents based on the feed material. (Same in all the examples described below.)

Reaction temperature (maximum catalyst temperature): 490° C.
S. V.: 6,000 hr.$^{-1}$
Concentration: ortho-xylene/air=22.2 g./m.$^3$ The results of the reaction are shown in Table 1.

TABLE 1

| $V_2O_5/K_2SO_4$, mole ratio | Yield of crude phthalic anhydride, percent | Phthalic anhydride contents, percent | Maleic acid in crystals, percent | Maleic acid by-product total, percent | Phthalide by-product percent | S.T.Y.,[1] kg./m.$^3$·hr. |
|---|---|---|---|---|---|---|
| 1:0.01 | 81 | 98.0 | 0.7 | 5.3 | 1.0 | 108 |
| 1:0.03 | 88 | 97.8 | 0.3 | 5.7 | 1.5 | 117 |
| 1:0.1 | 89 | 94.8 | 0.3 | 4.3 | 4.5 | 119 |

[1] S.T.Y. is calculated as crude phthalic anhydride (same in all the examples described below).

The above results show that by an increase in potassium sulfate content, oxidation is suppressed, the yield of the reaction intermediate phthalide by-product is increased and the quality of the crude phthalic anhydride is lowered.

REFERENCE EXAMPLE 2

The same procedure as in reference Example 1 was followed except that a vanadium pentoxide-titanium oxide catalyst was used. The results shown in Table 2 were obtained under the reaction conditions specified below:

Reaction conditions:

Maximum reaction temperature: 470° C.
S. V.: 7,000 hr.$^{-1}$.
Concentration: ortho-xylene/air=22.2 g./m.$^3$.

EXAMPLE 2

The same procedure as described in Example 1 was followed in the preparation of the catalyst except that a molar ratio of vanadium pentoxide:titanium oxide:potassium sulfate=1:1:0.03 was maintained and only the weight percent of vanadium pentoxide supported on the carrier was varied. The yields of phthalic anhydride obtained by the use of these catalysts are shown below:

| | | | |
|---|---|---|---|
| Vanadium pentoxide (percent) | 3 | 6 | 15 |
| Maximum temperature of the catalyst bed (° C.) | 440 | 450 | 480 |
| Feed material concentration (g./m.$^3$) | 45 | 45 | 45 |
| Space velocity (hr.$^{-1}$) | 6,000 | 6,000 | 6,000 |
| Phthalic anhydride yield (percent) | 93 | 98 | 93 |

TABLE 2

| $V_2O_5/TiO_2$, mole ratio | Yield of crude phthalic anhydride, percent | Phthalic anhydride content, percent | Maleic acid in crystals, percent | Maleic acid by-product total, percent | Phthalide by-product, percent | S.T.Y.[1] kg./m.$^3$·hr. |
|---|---|---|---|---|---|---|
| 1=0.1 | 85 | 98.7 | 0.1 | 6.5 | 0.5 | 132 |
| 1=0.3 | 89 | 98.9 | 0.1 | 6.6 | 0.4 | 148 |
| 1=1.0 | 80 | 99.3 | 0.3 | 7.5 | 0.2 | 124 |

[1] See footnote at end of Table 1.

The addition of titanium oxide to vanadium pentoxide accelerates the reaction rate and lowers the optimum reaction temperature. The yield of phthalide by-product is also lowered in comparison with the case where a vanadium pentoxide-potassium sulfate catalyst is used. Thus, the selectivity of the reaction is slightly improved. The oxidation yield, however, is less than 90%, showing that the oxidation proceeds more than desired.

EXAMPLE 1

A solution of potassium sulfate and then a solution of titanium tetrachloride are added to a solution of ammonium metavanadate in aqueous oxalic acid, and the resulting solution is sprayed on a 5 mm. alundum carrier, dried and supported.

The catalyst is so prepared that the weight percent of vanadium pentoxide in the catalyst after calcination is 5.

Ortho-xylene or naphthalene was oxidized by using the catalyst prepared as described above, and the results shown in the table were achieved.

We claim:

1. A catalyst composition which consists essentially of vanadium pentoxide, titanium oxide and potassium sulfate, wherein the molar ratio of vanadium pentoxide:titanium oxide:potassium sulfate in the catalyst is within a range of 1:0.1–5:0.01–0.2.

2. The catalyst composition of claim 1 characterized in that the molar ratio of vanadium pentoxide:titanium oxide:potassium sulfate in the catalyst is 1:0.3–1:0.02–0.12.

3. The catalyst composition of claim 1 characterized in that the said catalyst composition is supported on a carrier in the range of 2–20% by weight as vanadium pentoxide based on the weight of the carrier.

4. The catalyst composition of claim 3, characterized in that the said catalyst composition is supported on a carrier in the range of 3–15% by weight as vanadium pentoxide based on the weight of the carrier.

5. The catalyst composition of claim 2, characterized in that the said catalyst composition is supported on a carrier in the range of 2–20% by weight as vanadium pentoxide based on the weight of the carrier.

| Feed | Catalyst mole ratio, $V_2O_5$:$TiO_2$:$K_2SO_4$ | Maximum temperature of catalyst bed, ° C. | Feed material concentration g./m.$^3$ | Space velocity, hr.$^{-1}$ | Phthalide anhydride yield, percent | Phthalide by-product, percent | Maleic acid in crude product, percent |
|---|---|---|---|---|---|---|---|
| Ortho-xylene | 1:0 :0.05 | 450 | 45 | 6,000 | 87 | 1.8 | 8.80 |
| | 1:0.3:0.03 | 460 | 45 | 7,000 | 97 | 0.1 | 0.07 |
| | 1:0.3:0.08 | 470 | 42 | 5,000 | 94 | 0.4 | 0.10 |
| | 1:0.6:0.05 | 470 | 37 | 6,000 | 96 | 0.1 | 0.20 |
| | 1:0.6:0.1 | 460 | 40 | 7,000 | 96 | 0.3 | 0.09 |
| | 1:1.0:0.03 | 420 | 30 | 5,000 | 100 | 0.2 | 0.10 |
| | 1:1.0:0.03 | 440 | 50 | 5,000 | 98 | 0.1 | 0.10 |
| | 1:1.0:0.03 | 440 | 30 | 8,000 | 99 | 0.3 | 0.20 |
| | 1:1.0:0.03 | 480 | 70 | 8,000 | 93 | 0.2 | 0.30 |
| | 1:1.0:0.05 | 420 | 30 | 8,000 | 99 | 0.1 | 0.08 |
| | 1:1.0:0.05 | 460 | 70 | 5,000 | 95 | 0.2 | 0.12 |
| | 1:1.0:0.1 | 460 | 45 | 6,000 | 93 | 0.4 | 0.10 |
| | 1:2.0:0.0 | 450 | 45 | 6,000 | 82 | 0.4 | 0.92 |
| | 1:2.0:0.05 | 445 | 45 | 7,000 | 98 | 0.3 | 0.08 |
| | 1:2.0:01. | 450 | 50 | 5,000 | 94 | 0.4 | 0.10 |
| | 1:3.0:0.03 | 430 | 45 | 6,000 | 98 | 0.4 | 0.20 |
| | 1:3.0:0.06 | 440 | 45 | 7,000 | 97 | 0.5 | 0.13 |

| Feed | Catalyst mole ratio | Max temp | Feed conc | Space velocity | Phthalide anhydride yield | α-Naphthoquinone, percent | Maleic acid |
|---|---|---|---|---|---|---|---|
| Naphthalene | 1:1.0:0.03 | 440 | 30 | 5,000 | 100 | 0.18 | 0.20 |
| | 1:1.0:0.03 | 480 | 70 | 5,000 | 94 | 0.24 | 0.31 |
| | 1:1.0:0.03 | 460 | 30 | 8,000 | 97 | 0.21 | 0.25 |
| | 1:1.0:0.03 | 480 | 50 | 8,000 | 93 | 0.12 | 0.23 |

6. The catalyst composition of claim 5, characterized in that the said catalyst composition is supported on a carrier in the range of 3–15% by weight as vanadium pentoxide based on the weight of the carrier.

References Cited

UNITED STATES PATENTS

| | | | |
|---|---|---|---|
| 2,157,965 | 5/1939 | Pongratz | 260—346.4 |
| 2,769,018 | 10/1956 | West | 252—440 X |
| 2,954,385 | 9/1960 | Burney et al. | 260—346.4 |
| 2,956,065 | 10/1960 | Walt et al. | 252—440 X |
| 2,973,371 | 2/1961 | Chomitz et al. | 252—440 X |
| 3,038,911 | 6/1962 | Berets et al. | 252—440 X |
| 3,215,644 | 11/1965 | Kakinoki et al. | 252—440 |
| 3,402,187 | 9/1968 | Kaiser et al. | 252—440 X |

PATRICK P. GARVIN, Primary Examiner

U.S. Cl. X.R.

260—346.4